US009934321B2

(12) United States Patent
McCullough et al.

(10) Patent No.: US 9,934,321 B2
(45) Date of Patent: Apr. 3, 2018

(54) SYSTEM AND METHOD OF ACCELERATING RESPONSE TIME TO INQUIRIES REGARDING INVENTORY INFORMATION IN A NETWORK

(71) Applicant: OpenTable, Inc., San Francisco, CA (US)

(72) Inventors: Charles McCullough, Oakland, CA (US); Bryce Catlin, Hayward, CA (US); John Davis, Corte Madera, CA (US)

(73) Assignee: OpenTable, Inc., San Francisco, CA (US)

( * ) Notice: Subject to any disclaimer, the term of this patent is extended or adjusted under 35 U.S.C. 154(b) by 0 days.

(21) Appl. No.: 14/471,159

(22) Filed: Aug. 28, 2014

(65) Prior Publication Data

US 2015/0052030 A1 Feb. 19, 2015

Related U.S. Application Data

(63) Continuation of application No. 11/130,965, filed on May 17, 2005, now Pat. No. 8,856,117.

(60) Provisional application No. 60/623,778, filed on Oct. 29, 2004.

(51) Int. Cl.
*G06F 17/30* (2006.01)
*G06Q 10/08* (2012.01)

(52) U.S. Cl.
CPC .... *G06F 17/30902* (2013.01); *G06F 17/3048* (2013.01); *G06F 17/30339* (2013.01); *G06Q 10/087* (2013.01)

(58) Field of Classification Search
None
See application file for complete search history.

(56) References Cited

U.S. PATENT DOCUMENTS

| | | | | |
|---|---|---|---|---|
| 5,272,474 A | * | 12/1993 | Hilliard | 340/4.61 |
| 6,876,973 B1 | * | 4/2005 | Visconti | 705/5 |
| 2002/0065933 A1 | * | 5/2002 | Kobayashi | 709/234 |
| 2002/0103681 A1 | * | 8/2002 | Tolis et al. | 705/5 |
| 2003/0061080 A1 | * | 3/2003 | Ross | 705/6 |
| 2005/0033613 A1 | * | 2/2005 | Patullo et al. | 705/5 |

(Continued)

*Primary Examiner* — Christopher J Raab
(74) *Attorney, Agent, or Firm* — Van Pelt, Yi & James LLP

(57) ABSTRACT

A method and system for distributing access to inventory items available at vendor locations includes user stations transmitting user inquiries on a communications network. Network-connected location servers access a set of inventory availability information associated with inventory items available at their respective location, for example, tables at a restaurant. The host server receives user inquiries regarding availability of items associated with at least some of the location servers and queries a cache server that locally stores a binary subset of the information from the location servers to determine if the requested item is available without having to separately query the database at each location. Particularly, a web server receives and stores information regarding only whether a requested item is available or not available from a particular location rather than how many items are available at the location. A user, therefore, can access availability of inventory items with less communications traffic.

19 Claims, 10 Drawing Sheets

(56) References Cited

U.S. PATENT DOCUMENTS

| | | | | |
|---|---|---|---|---|
| 2005/0033621 A1* | 2/2005 | Hartmann | ............... | G06Q 30/02 |
| | | | | 705/5 |
| 2005/0182680 A1* | 8/2005 | Jones, III | ............... | G06Q 50/12 |
| | | | | 705/15 |
| 2005/0228677 A1* | 10/2005 | McCabe | ................ | G06Q 10/02 |
| | | | | 705/5 |
| 2005/0267787 A1* | 12/2005 | Rose et al. | ........................ | 705/5 |
| 2009/0234682 A1* | 9/2009 | Baggett | ................. | G06Q 10/02 |
| | | | | 705/6 |

* cited by examiner

| Find All              | Find Reservations | See             |
| Reservations Available| by Restaurant     | Restaurant List |

Party Size: 4 ▶
Date: Oct ▶ 11 ▶ 2004 ▶ Mo ▶
Time: 7 ▶ :00 ▶ PM ▶                    ( Search )—116

Make selections to search for availability at Atlanta restaurants

Atlanta Regions

┌─────────┐
│ Atlanta │—102
└─────────┘

-OR-

Atlanta Neighborhoods

┌──────────────────┐
│ Alpharetta       │—104
│ Buckhead         │
│ Chesire Bridge   │
│ Downtown         │
│ Duluth           │
└──────────────────┘

See list of Atlanta restaurants

Cuisines of Restaurant

┌────────────────────────┐
│ California             │
│ Creole/Cajun/Southern  │—106
│ European               │
│ French                 │
│ Fusion/ Eclectic       │
│ Italian                │
└────────────────────────┘

Price Range of Restaurants        —114
☑ All
☐ $$$$ = $51 or more
☐ $$$ = $31 to $50
☐ $$ = $16 to $30                 ( Search )
☐ $ = $15 or below Just Added Restaurants
Atlanta
Old Viking Inn
Frank's Pasta
Mario's Pizza
Lil' Bit of Spice
Ye Old Pub

FIG. 6

Search results for: Party of 4 on Monday, October 11 at 7:00 PM.
Select a time a click Submit

| RESTAURANT | NEIGHBORHOOD | PRICE | EARLIER | TABLES AVAILABLE REQUESTED TIME | LATER | |
|---|---|---|---|---|---|---|
| Ali Oli | Buckhead | $$$ | ○ 6:00 PM | | ○ 7:15 PM | Submit |
| Frank's Pasta | Sandy Springs | $$ | ○ 6:45 PM | ○ 7:00 PM | ○ 7:15 PM | Submit |
| Candy's | Inman Park | $$ | ○ 6:45 PM | ○ 7:00 PM | ○ 7:15 PM | Submit |
| Bo's Neighborhood | Virginia Highland | $$ | ○ 6:45 PM | | ○ 7:15 PM | Submit |
| Roma Roma | Inman Park | $$$ | ○ 6:30 PM | ⊙ 7:00 PM | ○ 7:30 PM | Submit |
| Sonny's | Alpharetta | $$$ | ○ 6:45 PM | ○ 7:00 PM | ○ 7:15 PM | Submit |

FIG. 7

SYSTEM AND METHOD OF ACCELERATING RESPONSE TIME TO INQUIRIES REGARDING INVENTORY INFORMATION IN A NETWORK

CROSS-REFERENCE TO RELATED APPLICATION

This application is a continuation of U.S. patent application Ser. No. 11/130,965, entitled SYSTEM AND METHOD OF ACCELERATING RESPONSE TIME TO INQUIRIES REGARDING INVENTORY INFORMATION IN A NETWORK filed May 17, 2005 issued as U.S. Pat. No. 8,856,117, which is incorporated herein by reference for all purposes, which claims priority to U.S. Provisional Application No. 60/623,778, entitled SYSTEM AND METHOD OS CATCHING INVENTORY INFORMATION IN A NETWORK filed Oct. 29, 2004 which is incorporated herein by reference for all purposes.

STATEMENT REGARDING FEDERALLY SPONSORED RESEARCH OR DEVELOPMENT n/a

FIELD OF THE INVENTION

The present invention relates to online inventory systems and, in particular, to a distributed, online, restaurant inquiry and reservation system utilizing multiple caching schemes to increase throughput, reduce the response time to online customers and to more efficiently utilize system and network resources.

BACKGROUND OF THE INVENTION

Rather than picking up the telephone, more and more customers choose to use the Internet to obtain tickets to sporting and various other entertainment events, to purchase goods from a store's inventory, and to secure their restaurant reservations. Through various websites, customers can enjoy easy access to information about restaurants and other events and book reservations quickly and easily. Efficiency is increased and time is saved when customers who wish to make restaurant reservations can do so online, in real-time, without the inconvenience of first searching for the restaurant's phone number and then placing a call directly to the restaurant to determine if there is an available "slot" (i.e., an available table of a certain size and for a certain time) to accommodate the customer's party.

One such practical use, although by no means the only use, is exemplified by customers who travel, either for business or pleasure. Such customers may want to book reservations at restaurants well in advance of their visit. Websites that facilitate real-time online restaurant reservations may allow the customer to enter the name of the geographic region they are planning to visit, the name of the restaurant they wish to dine at (if known), and the date and time they wish to dine along with the size of their party. The website may then determine if that particular restaurant can accommodate the customer and his or her party at the requested time. Other search criteria may include preferred cuisine, price, similar restaurants, restaurants close in proximity to an address, restaurants recommended by people who dined at this a specific restaurant, and other promotions offered by restaurants in the area.

Once a restaurant is selected, the website accesses the restaurant's database, which contains the restaurant "inventory", i.e., the number of tables in the restaurant, the seating capacity of the tables, and which of those tables that have been reserved for a particular time slot. This may be a simple task if the customer has specified the name of the restaurant. However, if the customer simply types in a type of cuisine, e.g., "Italian Food", in a geographical region, e.g. "Atlanta, Ga.", the website must query the inventory database of each participating Italian restaurant in Atlanta, perhaps several hundred or thousand. The query would be identical, e.g. "do you have an available table for four, between 7 and 7:30 PM on the evening of July $12^{th}$?" The website may send 1,500 identical real-time messages and receive 1,500 real-time responses. Needless to say, this is not an efficient way of determining availability since the volume of messages would increase linearly as restaurants are added. The speed and performance of the non-reservation functionality at each restaurant (e.g., wait list management, table management, database management) would degrade due to the increasing queries from patrons seeking to book an available table. In addition, the performance of the restaurant searches themselves would degrade as an instantaneous function of the number of other concurrently active searches. Each query requesting a table would compete with other similar queries interested in booking an available table at the selected restaurant. Finally, the performance of the non-search related functionality inherent to the system also degrades, preventing restaurant employees from accessing those capabilities in a timely fashion.

Indeed, such an online reservation system may store complete restaurant table inventory information directly in the website database. While this serves to provide an entire backup database of all tables at participating restaurants, it also puts a severe strain on system resources. In this scenario, the website database is consulted upon each user inquiry for a particular restaurant. The website must search through its database for each restaurant and determine whether a particular table capacity has already been reserved for a particular time slot. A great deal of the inventory information stored on the website database is never checked and is irrelevant in determining if a table for a specified party size and time is available. For example, the user does not care if 2, 3, or 4 tables of four are available for the user's party at the requested time. The user is only interested if one table is available that can accommodate his/her party size. Or, if the user needs two tables of four, he/she need not be concerned if more than two tables of four are available at the chosen restaurant at the desired time. Thus, this approach would needlessly store a great deal of unnecessary inventory information, which, if the user's status request is to be satisfied, must be checked upon each and every user inquiry.

Further, this approach is inefficient because a message is sent to the central server every time there is change at the restaurant database level (e.g., every time a reservation is booked). These constant and unnecessary network messages waste bandwidth and degrade the performance of the network.

It is therefore desirable to have a method and system that reduces the message "traffic" between the host website and the restaurant inventory databases, decreases bandwidth demands upon the network, and decreases CPU demands on the restaurant servers.

It is further desirable to have a method and system that utilizes a caching scheme at the website to reduce the need for real-time searching of the restaurant databases and, thereby, increase overall online reservation searching efficiency.

It is also desirable to have a method and system that stores only "summary" information on a website's server, rather than complete table inventory, where the summary information provides information regarding whether a table of a specified size is available rather than how many tables of the requested size are available. The existence of summary-level information will minimize network messages, prevent the central server from being flooded by network message traffic, use less memory, and conserve system resources. It is further desirable to have a method and system that places the cache server at a location different from the reservation server and the website server.

SUMMARY OF THE INVENTION

The present invention addresses the deficiencies of the art with respect to online inventory inquiry systems and provides a novel and non-obvious method and system for determining the availability of inventory items at various locations in a data network by maintaining a cache of summary information in a central location, which obviates the need to query each location's database to obtain available item inventory information.

In accordance with the present invention, an inventory inquiry system for communication with one or more location database servers is provided. The one or more location database servers are each adapted to store item inventory information for at least one location. The system includes a website in communication with the one or more location database servers via a communications network. The website is adapted to receive inquiries regarding item availability at one or more locations. The website includes a cache of summary information, which can include a cache server, adapted to maintain summary information received from the one or more location database servers, where the summary information represents a summary, or binary change in inventory status, i.e., from "yes" (available) to "no" (unavailable), or vice versa. Alternatively, the cache can be separate from the website server and hosted at a location entirely separate from the website or at the location database servers at the host location, which can be, for example, a restaurant, a retail store, a ticketing system, a public transportation system, or any other type of system where inventory is constrained and availability is constantly changing.

In another aspect of the invention, an online restaurant table availability system for communication with one or more restaurant database servers is provided. The one or more restaurant database servers are each adapted to store table inventory information for at least one location. The system includes a website in communication with the one or more restaurant database servers through a communications network. The website is adapted to receive inquiries regarding table availability for a specified table capacity and a specified time. The website also includes a cache server adapted to maintain summary information received from the one or more restaurant database servers, where the summary information represents a binary change to the availability status of tables for the specified capacity at the specified time. Alternatively, the cache server can be separate from the website server and hosted at a location entirely separate from the website or the location database servers at the restaurants.

In yet another aspect of the invention, an online inventory inquiry and reservation method is provided. The method includes retrieving summary information relating to incremental changes in item availability from one or more distributed database servers, maintaining the summary information relating to incremental changes in item availability retrieved from the one or more distributed database servers in the cache, receiving an inquiry from a user regarding item availability at one or more locations, and determining item availability by accessing the summary information relating to incremental changes in item availability stored in the cache.

In still another aspect of the invention, a machine readable medium is provided, wherein the machine readable medium includes instructions stored thereon for execution by a processor to perform a method of responding to online inventory inquiries. The method includes receiving summary information relating to incremental changes in item availability sent, or "pushed," from one or more distributed database servers, retrieving, or "pulling" summary information relating to incremental changes in item availability from one or more distributed database servers, populating and maintaining the summary information relating to incremental changes in item availability retrieved from the one or more distributed database servers in cache memory, receiving an inquiry from a user regarding item availability at one or more locations, and determining item availability by accessing the summary information relating to incremental changes in item availability stored in cache memory.

In yet another aspect, a website for processing online restaurant table availability inquiries is provided. The website is in communication with one or more restaurant database servers through a communications network. The one or more restaurant database servers are each adapted to store complete table inventory information for at least one location. The website includes one or more servers adapted to receive inquiries regarding table availability for a specified table capacity and a specified time, and a cache server adapted to receive and store messages from the one or more distributed restaurant database servers. Each inventory message from a distributed restaurant database server represents a change in summary information regarding the tables available for the specified size at the specified time, wherein the summary information represents whether a table of a particular size and type has become available or is no longer available. The cache server need not be at the website and may be at an entirely different site and connected to the website through the Internet.

In another aspect, the invention is an online inventory inquiry and reservation method for determining inventory availability at one or more locations. The method includes maintaining a complete inventory database at one or more local servers, generating a data structure consisting of the summary inventory information, where the summary inventory data forms a subset of the complete inventory database, transmitting the summary inventory data to a central server, and maintaining the summary inventory subset at a central server. The central server is receptive to customer inquiries regarding item availability at the one or more locations.

The present invention maintains a copy of specific local data in memory (e.g., RAM) at each local server that can be accessed faster than the local disk, in order to avoid impacting the performance of unrelated functions when the local data is accessed. The present invention maintains at the central location only a summary of availability data to accelerate response time (only the central location needs to be searched), to reduce the bandwidth that is required for communication between the central computer and the local computers (because messages only need to be sent if availability changes to/from the summary threshold), and to minimize the need for the local computers to send updates to the central computer. The system and process of the present invention generating summary-only data at local servers for transmission to the central server also avoids impacting the performance of unrelated functions at the local servers when the local data is accessed and therefore accelerates access to the non-summary local data.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein:

FIG. 6 is a diagrammatic representation of an exemplary web page presented to the user after a geographic region has been selected; and FIG. 7 is a diagrammatic representation of an exemplary web page presented to the user that includes restaurants with available tables based upon the user's input parameters.

DETAILED DESCRIPTION OF THE INVENTION

Figure 1:
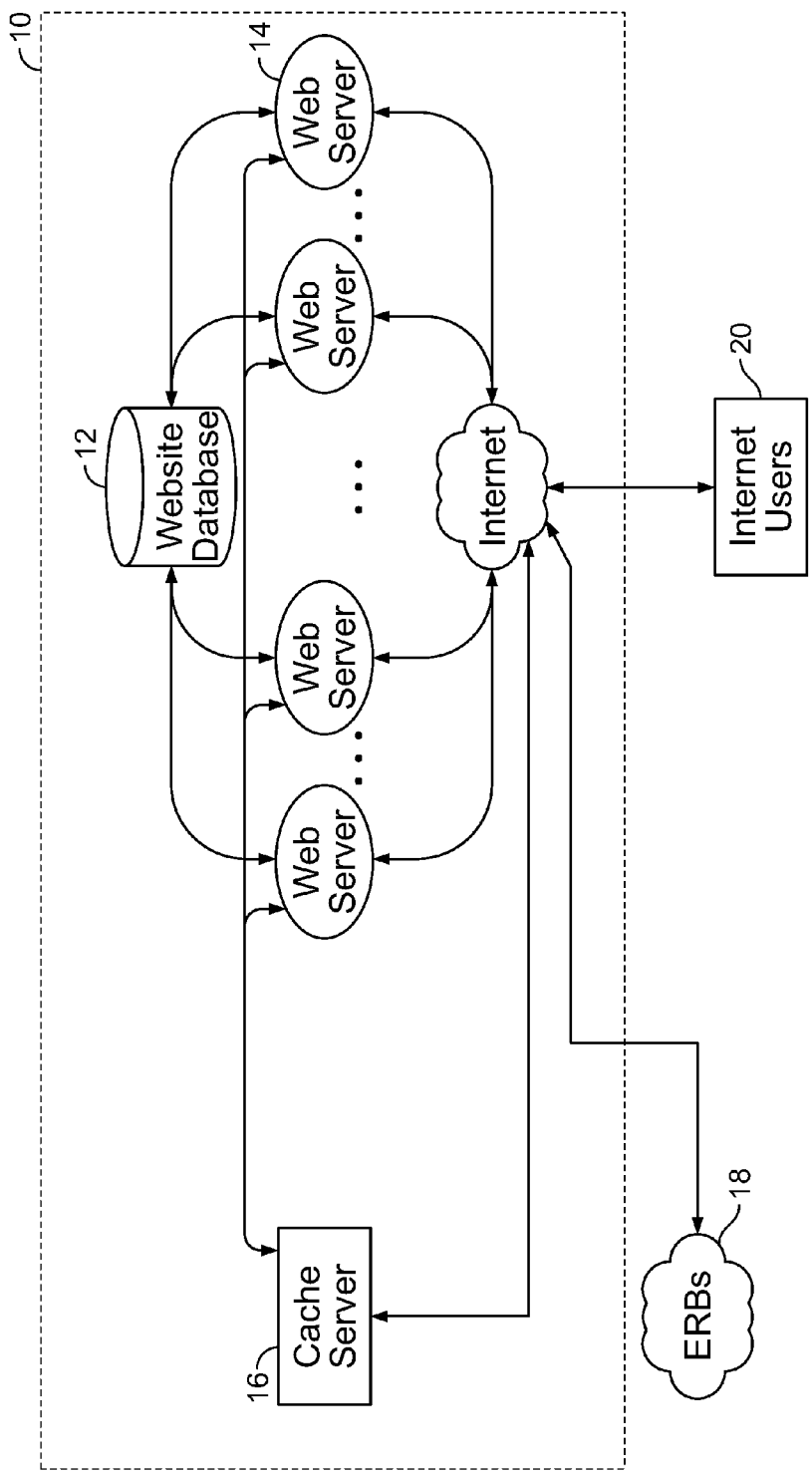
FIG. 1 is a block diagram of an exemplary structure of the system according to the invention.

Referring now to the drawing Figures in which like reference designators refer to like elements, there is shown in FIG. 1 an exemplary embodiment of the system protocol between a host website 10 that receives customer inquiries over a data communications network as to the availability of certain items at particular locations, and location servers containing databases 18 (also referred to as Electronic Reservation Books or "ERBs") at those locations that contain inventory availability information for each item.

Although the invention described herein is adaptable for use in any inventory availability system over a data communications network, an exemplary embodiment illustrating how the present invention operates takes the form of an Internet-based restaurant-availability searching system. Thus, the ERBs 18 each can represent a restaurant that has subscribed to the reservation searching/placing system of the present invention. Further, although the preferable data communications network is the Internet, the invention is equally adaptable over an intranet or virtual network, a dial-up network, or any network capable of communicating data between user terminals.

In FIG. 1, the website 10 includes a website database 12, and one or more web servers 14, which receive inquiries from network users 20. Database 12 is, preferably, any known database system such as a relational or object oriented database system that can be programmed to support and maintain a directory of participating restaurants existing in the network. Servers 14 store a variety of web pages that can be accessed by browser software on the user's terminal, communicate with a cache server 16 to receive summary inventory information, and retrieve information stored in website database 12. Although multiple servers 14 are depicted in FIG. 1, the invention may incorporate one web server 14 or more than one. The term "server" as used in this application refers to a computer or computers, its associated network hardware, and all software stored thereon. Therefore, this term is not limited in scope to a standard computer server. Further, although the cache server 16 is shown as being a part of the host website 10, such a configuration is not necessarily required. As shown by the dash-dotted line in FIG. 1, the cache server 16 can be physically separate from the host website 10 and connection therebetween can take place through a network, such as the Internet.

In the embodiment shown in FIG. 1, the host website 10 includes the cache server 16, which stores summary inventory information in memory. The cache server 16 stores summary inventory information received directly from ERBs 18 via a network connection. Each restaurant that participates in the reservation service includes its own database. Each ERB 18 is in data communication with website 10 and, more particularly, with the cache server 16 and web server 14 through the Internet. The communication can be direct between the host website 10 housing the cache server 16, as shown in FIG. 1, or can be indirect, where the cache server 16 is separate from the host website 10 and is connected, like the website 10 to each ERB 18 through the Internet (dash-dotted line). Thus, the cache server 16 is in communication with web server 14 and each ERB 18. The information exchanged between the ERBs 18 and the cache server 16 is discussed in greater detail below with regard to FIG. 2, for example.

Caching allows a subset of information stored on a remote system to be stored locally. Caching accelerates the processing of requests by reducing the need to fetch the requested information from the remote system. The cache server 16 stores only a summary of the restaurant table availability information that is maintained by ERBs 18 to reduce the need for real-time searching of each ERB 18. Rather than storing the complete inventory for each restaurant, the cache server 16 only maintains a summary of table availability for each restaurant. Thus, the cache server 16 only receives updates from ERBs 18 that result in changes in table availability for each restaurant and, more particularly, changes in table inventory that result in either a previously unavailable time slot/party size combination that has become available or a previously available time slot/party size combination that has become no longer available.

Each restaurant (ERB 18) typically stores a complete inventory of all tables at the restaurant. Table information may be stored by table capacity and, perhaps, location of the tables within the restaurant (e.g., situated near a window, outside, away from the kitchen, etc.). All of this information is stored in each restaurant's database. Restaurants also have a cache memory that stores information regarding available tables. The number and capacities of available tables are stored in the restaurant's cache memory. Restaurants receive telephone calls or e-mails directly from interested patrons. The callers request a particular table capacity at a particular date and time. As reservations are made, the restaurant records this information and, using only the portion of that information relating to table availability, revises its cache. Thus, at a given time, each restaurant stores the entire number and capacity of all its tables in its database, while also storing full (not summary) availability information for a configurable set of days in the future and a configurable range of party sizes in its cache memory.

While each restaurant's cache memory typically stores table availability information for a 60-day look-ahead period and capacities of, for example, between 2 and 10 in its cache memory, the cache server 16 of the present invention does not need to store all of this information. Instead, the cache server 16 is configured to store only a summary of available table inventory for only a subset of the look-ahead period and the table capacity, yet is still able to satisfy a very high percentage of availability requests. The cache server 16 stores only a summary (i.e., a binary value) of table availability for each participating restaurant looking ahead only "m" days, for instance, 30 days, and for tables that accommodate a party of size "n", for instance, parties of 2 to 6, because it is rare for a user to reserve a table more than thirty days in advance for a party larger than 6. Further, statistical studies show that approximately 98% of internet users 20 search for party sizes between 2 and 6 and for a date range of up to 30 days in the future. Thus, cache server 16 is configured in the preferred embodiment to accommodate availability requests for up to thirty days in the future for parties between 2 and 6 quickly without having to poll each ERB 18 because it already has the necessary table availability information, in "summary" form, stored in the cache server 16. So configured, the cache server has a cache hit rate of 98% resulting in only 2% of the availability search requests actually searching the ERBs 18 and, therefore, cutting search traffic between the website 10 and ERBs 18 to only 2% of the search traffic of the system and implementation of the prior art.

More specifically, the cache server 16 stores only a summary of the information that is stored at each ERB 18. This is because, at the point in time that the website 10 performs a search, the website 10 is only interested in whether or not there is table availability, and not in how many tables may be available. Thus, to decrease network memory demands and to increase website performance, the cache server 16 only stores summary information (in binary form) relating to table availability at each restaurant and not the entire inventory. The changes in table availability result in "yes/no" data, a binary number, which takes up significantly less space, is faster to read and process than numerical availability data and, most importantly, reduces state transitions, therefore reducing message traffic resulting in minimizing degradation of the overall restaurant system functionality.

The cache server 16 receives summary information from the ERBs 18 only when there has been a material change in availability. The term "material" is given a broad definition and may represent any predetermined change in inventory. For example, it may be defined as a condition where the number of available tables for a particular party size and time has changed from more than zero to zero, or vice-versa, or, the condition where the number of available tables for a particular party size and time has changed above or below any predetermined number. In other words, rather than being interested in all changes in table inventory for a particular restaurant—which is typically how each restaurant tracks changes to its table inventory—cache server 16 is only interested in changes to inventory information that result in a table or tables of a particular size becoming available, or a table or tables that were previously available no longer being available. Updates of "material" changes in inventory are provided to the cache server 16 when they happen.

Website 10 uses the summary inventory information stored in the cache server 16 to satisfy customer searches. In this fashion, the number of real-time searches taking place directly between the website 10 and the ERBs 18 is greatly reduced. Each ERB 18 may also maintain its own cache of table availability inventory. Whenever a material change in table inventory occurs at a particular restaurant, a CacheUpdate message (see, e.g., message 181 in FIG. 2) is sent from the ERB 18 for that restaurant to the cache server 16 and the summary inventory information in the cache server 16 is updated accordingly.

When cache server 16 is initialized, it is empty. Cache server 16 constructs the cache by sending a CacheRequest message to every ERB 18 (see, e.g., message 161 in FIG. 2), thus, requesting the table inventory information, in summary form, from each ERB 18. ERBs 18 respond by sending summary inventory information (CacheRefresh message (see, e.g., message 181 in FIG. 2)), i.e., a summary status of table availability, from their respective cache, to the cache server 16. The cache server 16 controls its own initialization and the website 10 starts searching the cache server 16 as soon as it is up. The cache server 16 returns cache misses for any ERBs 18 that are not yet cached, and the website 10 optionally searches those ERBs 18 directly.

The cache initialization and update protocol includes a mechanism that permits the cache server 16 to determine if its latest received summary update from ERB 18 is current, or out of date. Cache server 16 uses a sequence number to determine if it has missed any updates. For example, each CacheUpdate message 181 that it receives from an ERB 18 includes a sequence number that is exactly 1 more than the sequence number attached to the previous CacheUpdate message 181. If cache server 16 receives a sequence number that is not exactly 1 greater than the previous sequence number, it knows that at least one update message was not received. If the cache server 16 detects a lost message, it invalidates the summary information in the cache server 16 for that particular ERB 18 and sends another CacheRequest message 161 to that ERB 18.

Figure 2:
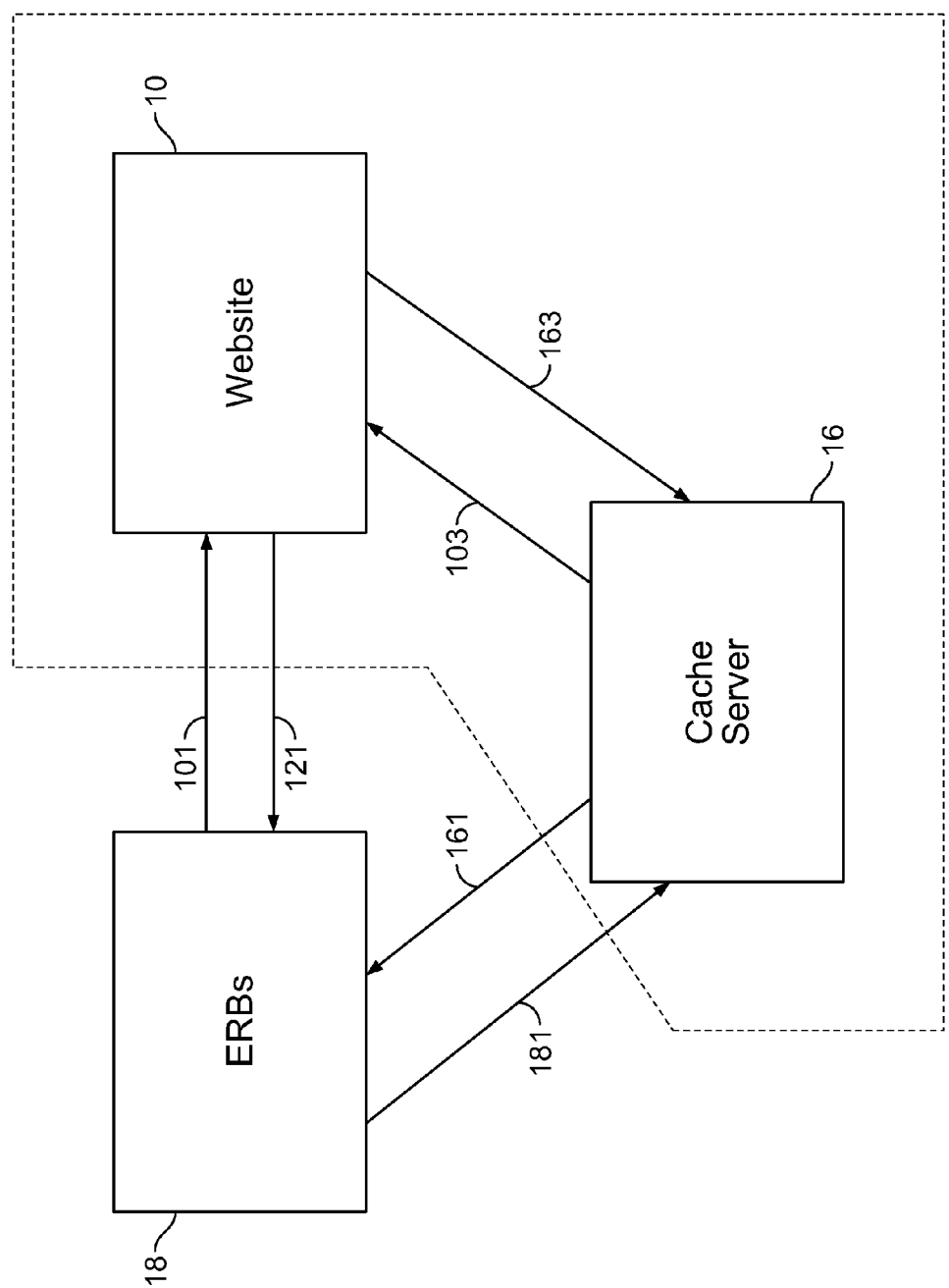
FIG. 2 is a block diagram of an exemplary message communication structure in the system of FIG. 1.

FIG. 2 describes the message flow in the preferred system and method according to the present invention. The dashed lines in FIG. 1A indicate that the website 10 and cache server 16 can be separate servers or part of the same server. The website 10 sends to each of the ERBs 18 messages 101 including an availability checking message (CheckAvail) asking the ERBs 18 for availability at a given date, time, and for a given party size, and actual reservation-placing commands 101 to book a reservation at the user-selected ERB 18. The ERBs 18 send messages 121 to the website 10, which include "heartbeat" messages—sent in situations where an ERB 18 is unable to communicate with the cache server 16. The website 10 also sends outgoing messages 103 to the cache server 16 to request the list of restaurants that are reachable according to cache server 16 and to request particular table availability information contained in the summary data that is stored in the cache server 16—both of which are immediately acknowledged and replied to the website 10 by the cache server 16. The messages 103 also include relayed "heartbeat" messages from the ERBs 18 as described in further detail below. The ERBs 18 send messages 181 to the cache server 16 including CacheRefresh messages (a reply to a CacheRequest as described below) representing summary table inventory information, CacheUpdate messages representing changes in table availability, and "heartbeat" messages as described below. The cache server 16 sends messages 161 to the ERBs 18 to request an update to the cache server 16 (CacheRequest) to initialize or re-initialize the summary information contained in the cache server 16 for that specific ERB 18.

The cache server 16 also handles non-caching functions. In addition to the binary caching of table availability, the cache server 16 also keeps track of the set of restaurants (ERBs 18) that are online and reachable. Determination of "online" and "reachable" status is based on a simple set of rules set forth in the following text.

1. Every ERB 18 must send/receive a message to/from the website 10 at least once every 10 minutes. "Message," as it is referred to herein, means any communication that the ERB 18 can send/receive to/from website 10—typically it would be responses to searches or to transactions initiated by the website 10 (for example, make reservation, change reservation, or cancel reservation). The restaurant computers (ERBs 18) also send some unsolicited messages—which also are included in the definition of "message."

2. If the ERB 18 has not sent/received a message to the website 10 in the last 10 minutes, it is configured to send a special message called a "heartbeat," to let the website 10 know that it is still "online/reachable."

3. If the website 10 does not send a message to an ERB 18 or fails to receive a message from that ERB 18 for at least 12 minutes, it considers that ERB 18 to be offline and not reachable.

The 10 minute/12 minute values are selected to allow both the ERB 18 and the website 10 to each have timers that are incorrect by up to 59 seconds. The ERB 18 can send a message 59 seconds late, and the website 10 can check 59 seconds early, with there still being a 2-second margin of error.

The website 10 implements its part of the process by maintaining a field in its database 12 for each ERB 18 called "last time contacted." Any time that a web server 14 receives a message from an ERB 18, it updates the last time contacted field for that ERB 18 in the database 12. Likewise, any time that a web server 14 sends a message to an ERB 18, it updates the last time contacted field for that ERB 18 in the database 12. A periodic process in the website 10 looks through all of the ERB records in the database 12 to see if there were any that are online but have a "last time contacted" value longer than the timeout (e.g., 12 minutes). If the website 10 finds any, it changes the particular ERB's 18 status in the database 12 to "offline/not reachable." Receipt of any message from an "offline/not reachable" ERB 18 moves it back to "online/reachable." Every time that the website 10 decides to search ERBs 18, it determines which ERBs 18 are actually searchable by checking for the "online/reachable" status.

In an alternative embodiment of ERB 18 functionality, different rules can be used. For example, the values can be 90 seconds instead of 10 minutes with similar basic logic.

An improvement to this configuration is important for large networks, such as the restaurant network implemented by a preferred embodiment of the present invention. Maintaining the "last time contacted" field in the database 12 for all of the ERBs 18 generates a significant amount of database 12 activity, which interferes with other database 12 operations that the website 10 attempts to accomplish. The improvement, therefore, relates to having the cache server 16 keep track of the "last time contacted" field. As such, the cache server 16 directly handles all "heartbeat" messages from ERBs 18 and, anytime that a web server 14 sends/receives a message to/from an ERB 18 (responses to search, make, change, cancel, or any other message), the web server 14 notifies the cache server 16. The cache server 16, accordingly, updates the "last time contacted" field in the database 12 once per minute. At the same time, the cache server 16 maintains the "online/reachable" or "offline/not reachable" status for each ERB 18 and stores this information in its memory. Any messages sent/received from an ERB 18 affect the online/offline and reachable status for that ERB. Thus, the web servers 14 no longer check for "online/reachable" status in the database 12. Instead, every 1 to 2 minutes, the web servers 14 send a message 103 (ReachabilityRequest) to the cache server 16 and the cache server 16 replies 163 with a full list of the ERBs 18 that are reachable. With such a configuration, the website database 12 gets updated once per minute instead of several times per second (or more often) and the website's database 12 is not used at all to determine which ERBs 18 are online/reachable. Such a configuration dramatically improves the performance of the database 12.

The cache server 16 can have a different subset of responsibilities than that described herein. For example, the cache server 16 can just be responsible for online/offline tracking. While the cache server 16 may actually have the binary inventory information available, the web servers 14 could ignore that information and can always directly search the ERBs 18.

Alternatively, the web servers 14 can be configured to always directly search the ERBs 18, and to compare the results thereof to the inventory data that was returned by the cache server 16. In this way, it is possible to verify that the cache server's 16 inventory data is always correct.

Also, the web servers 14 can be configured to actually use the cached inventory data in the cache server 16, but also have the web servers 14 use a sampling algorithm to search the ERBs 18 occasionally, comparing the results from the cache server 16 to the results from the ERBs 18, as continual verification that the cached data is accurate in the cache server 16.

Figure 3:
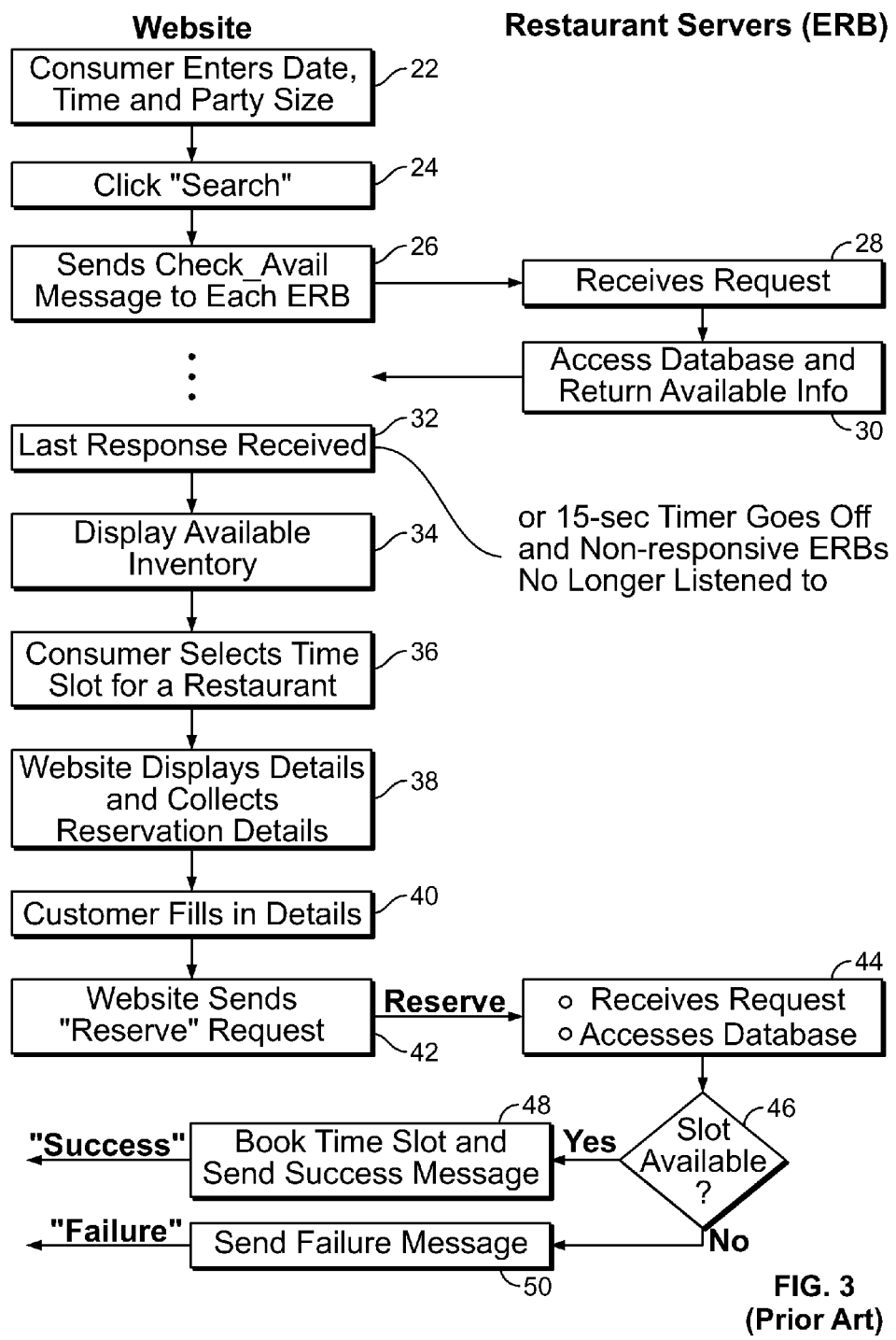
FIG. 3 is a flow chart of a process performed by prior art online reservation systems.

FIG. 3 illustrates the steps taken by prior art Internet-based reservation systems. At a website's prompt, the customer enters, at step 22, a variety of search parameters such as the region they wish to dine in, the date they wish to dine, the time, and the party size. Then, the user clicks "search" in step 24. In step 26, the website sends a message to each ERB 18 to check for available tables having the parameters entered by the customer and sets a response timer. At step 28, each ERB 18 receives the message and, at step 30, accesses its database and returns availability information to the website.

Upon receipt of the last response from the ERBs, or after waiting a configurable number of seconds, typically 15, without receiving responses from all ERBs (step 32), the website displays the available inventory in step 34. Then, the customer is prompted in step 36 to select a restaurant and time slot for his/her reservation in that restaurant. The website displays details about the selected restaurant and collects reservation details from the customer in step 38. Now, the customer must fill in the reservation details on the website (step 40), at which time the website sends a "reserve" request out to ERB 18 for the selected restaurant (step 42). The selected restaurant receives the request, and accesses its database in step 44. The ERB checks, in step 46, to see if a table for the requested time and party size is still available. If a table is available, the time slot is booked with the customer's reservation details in step 48 and a "success" message is sent to the website. If a table is not available at the selected time, a "failure" message is sent to the website in step 50.

The prior art system shown in FIG. 3 creates "race" conditions during the window of time from when customers (either local ERB customers or web customers) select a restaurant (step 36) until the time the customers complete the reservation details form at step 40. Further, the system shown in FIG. 3 must query the ERB every time there is a request for table availability at a particular restaurant for a selected party size and time. Thus, because changes in available table inventory are not cached outside of the restaurant's database, a database query is run in real-time, at the restaurant's database, to determine the table availability at a requested time. If multiple customers access the website to search a particular area, e.g., the New York metropolitan area, a message/response pair is generated for every restaurant that is searched, resulting in hundreds or thousands of messages, each containing the same message content.

Figure 4A:
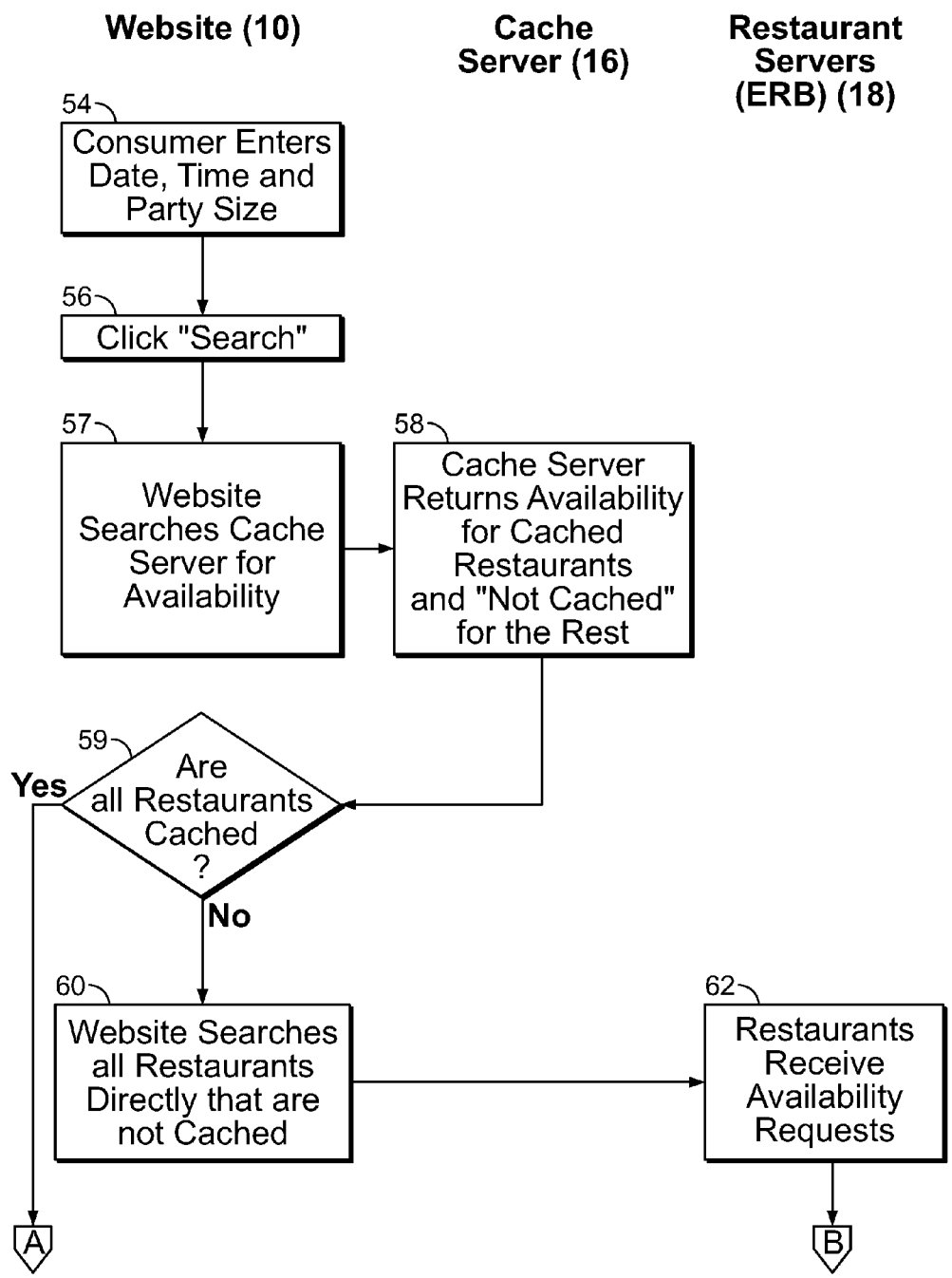
FIG. 4A is a first part of a flow chart of an exemplary process according to the invention.
Figure 4A:
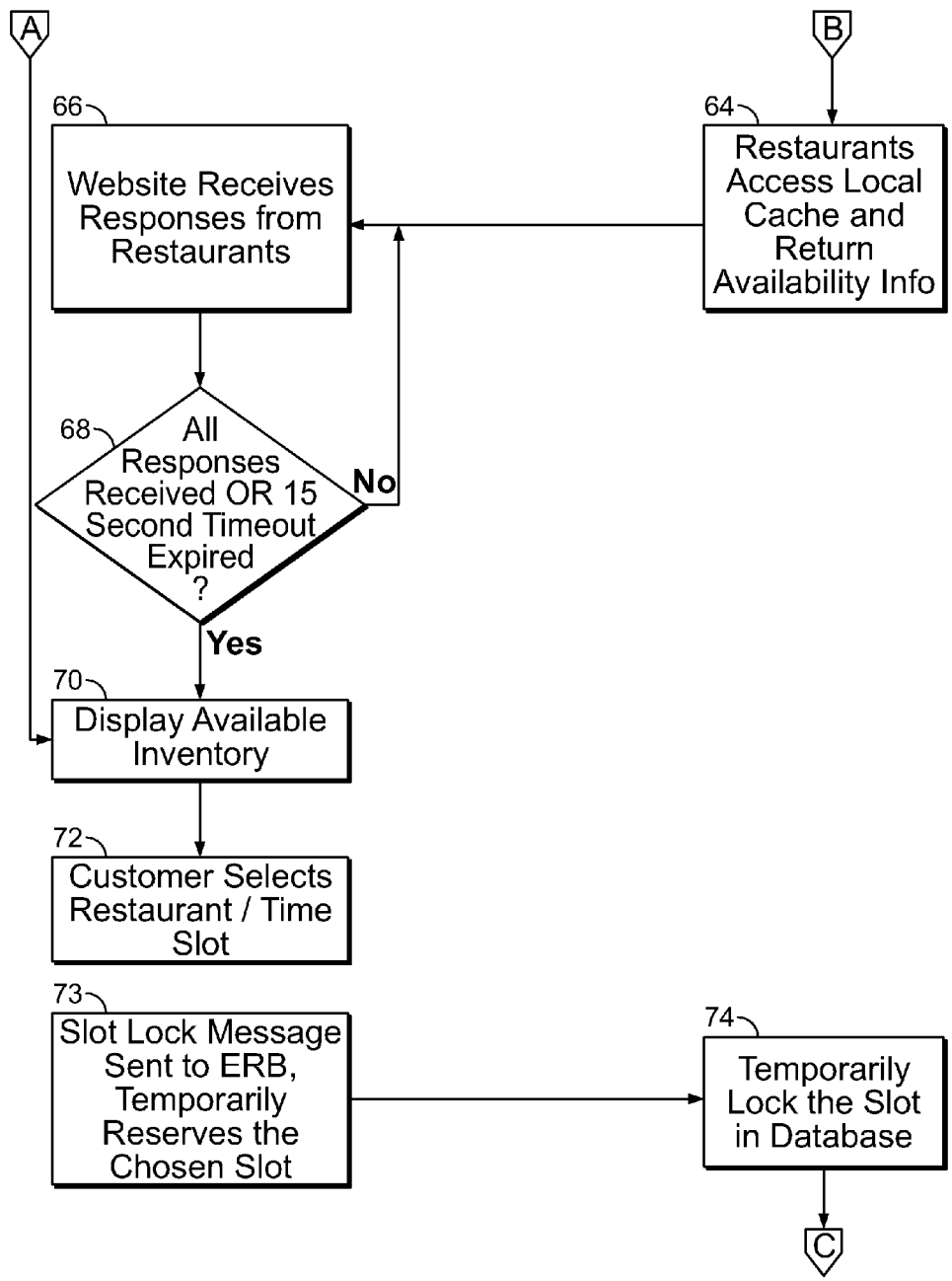

An exemplary process of using the website 10 of the present invention is described with reference to FIGS. 4A and 4B. In the embodiment shown in FIG. 4A, a consumer is presented with an introductory web page (see FIG. 5) and, in steps 54 and 56, selects a date, time and party size and initiates a search at the host website 10. However, as shown in FIG. 4A, the website 10 first checks the cache server 16 to determine availability information for the date, time, party size requested for all restaurants known to the cache server 16 (step 58). The website processes the results in step 59 and determines if all restaurants are cached. If one or more restaurants have not yet sent summary inventory information to the cache server 16, in a parallel process for checking availability, the website 10 sends a CheckAvail (search) message 101 to each of those ERBs 18 in step 60. Each ERB 18 receives the CheckAvail message in step 62, accesses its local cache, and returns table availability information in step 64.

The website 10 continues to receive responses from ERBs 18 in step 66. This process continues until all responses are received or the timeout expires (step 68). At that point, the website 10 displays the results from the ERBs 18 that responded to the request for availability in step 70.

If all participating ERBs 18 have submitted their summary inventory availability information to the cache server 16 (step 59), website 10 does not need to query each ERB 18 (steps 60-68) for the customer's search and the process proceeds directly to step 70 where the available inventory is displayed to the user's viewing device. Because the website 10 can refer directly to the cache server 16, which stores only summary table availability for all ERBs 18, the website 10 does not need to query each ERB 18 every time a customer enters a search request (if the cache server 16 has all restaurants cached).

In another embodiment, after the cache server 16 returns availability results to the website 10 (step 58) the cache server 16 asynchronously requests the summary inventory information from those ERBs 18 for which it does not already have such summary inventory information.

In another embodiment, the website 10 omits non-cached restaurants from the search results instead of sending search requests (CheckAvail messages) to those ERBs 18.

At step 70, the customer is presented with the available inventory information for the set of restaurants searched and selects his or her desired restaurant choice and slot (i.e., date, time, party size), and the website 10 displays details about the selected restaurant on the user's viewing device.

Figure 4B:
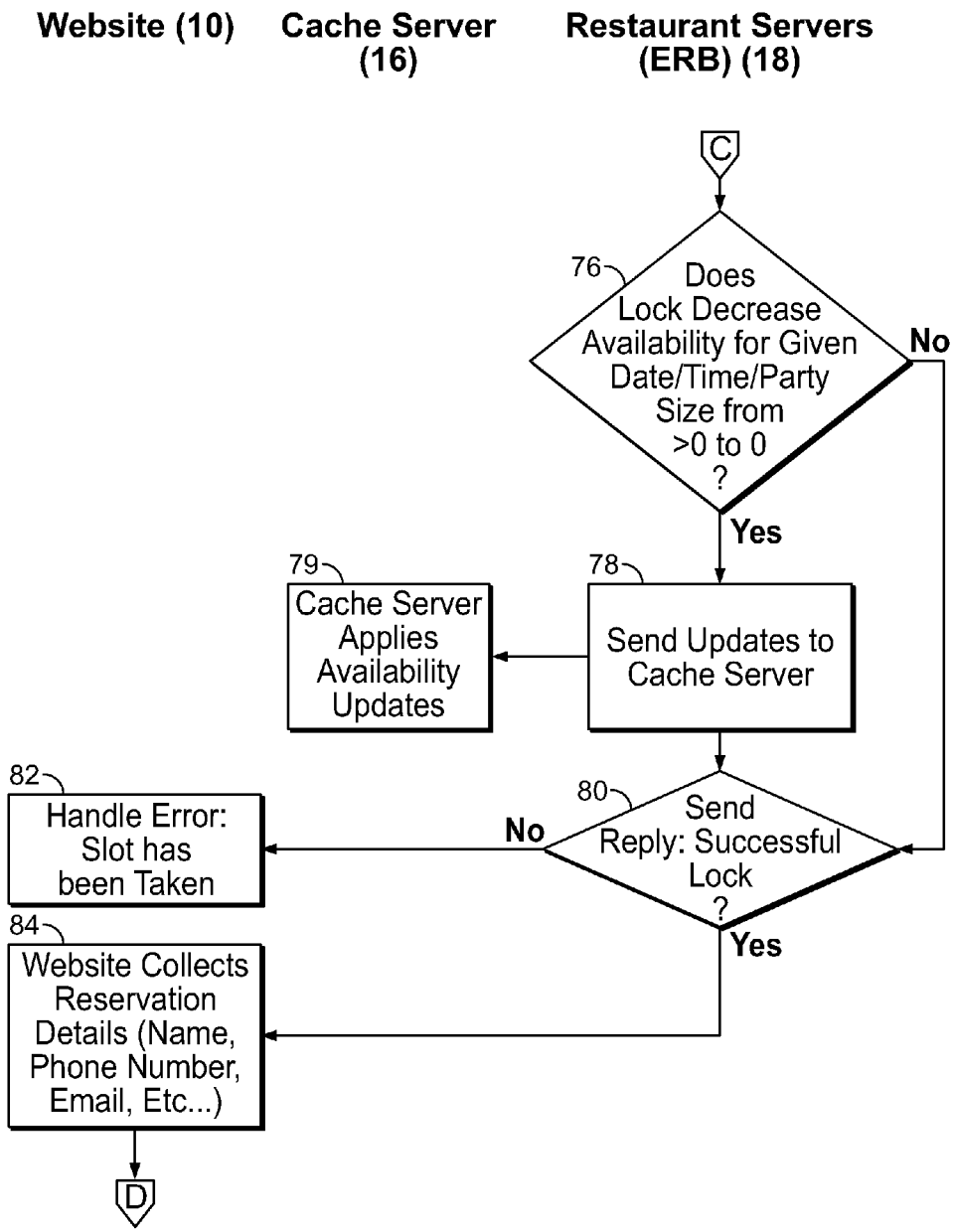
FIG. 4B is a second part of the flow chart of the process of FIG. 4A.
Figure 4B:
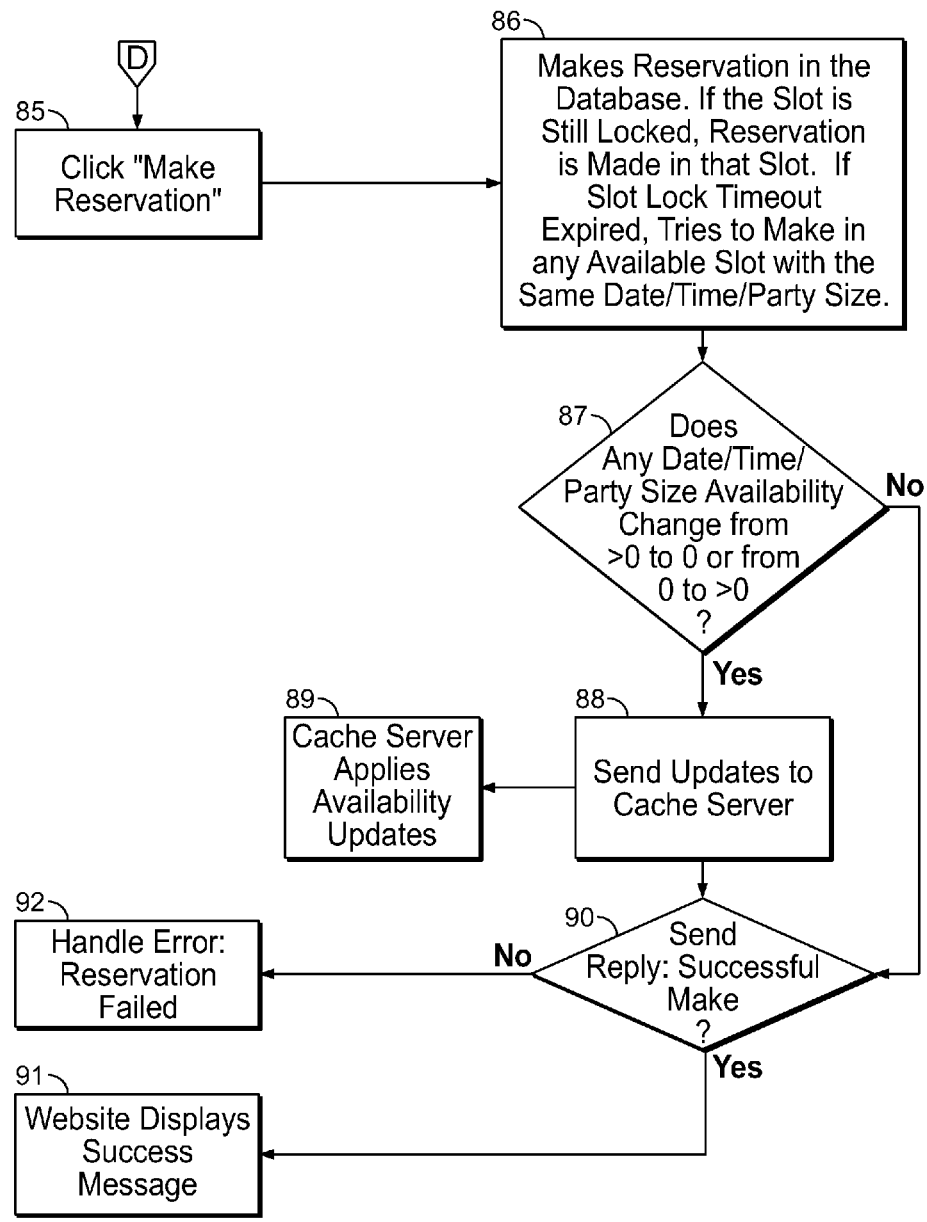

FIGS. 4A and 4B also illustrate an embodiment that eliminates "race" conditions that can occur when multiple online customers attempt to reserve tables. As shown in FIGS. 4A and 4B, a temporary lock is placed on a time slot once someone selects the slot and begins to fill out the reservation details.

Once a customer selects his or her chosen slot (step 72) the website 10 attempts to temporarily lock the time slot on the day that was selected by sending a message to the selected ERB 18 in step 73. The message requests that a slot be "locked" and specifies how long the "lock" status will be in place. The duration of the "lock" status is predetermined and configurable in website 10. Upon receipt of the message, in step 74 the selected ERB 18 temporarily locks the time slot as taken by the user. A "lock" status decreases the number of available tables for the given party size, date, and time at the selected restaurant. If the "lock" causes the number of available tables for the given party size, date, and time to drop to zero (step 76), the ERB 18 will immediately send a CacheUpdate message to the cache server 16 (step 78) informing it that the cache must be updated with respect to that ERB 18. The cache server 16 applies the CacheUpdate in step 79 and, as a result, no longer offers tables of the selected size at the given date and time.

Thus, the cache server 16 only receives incremental changes in table availability that are "material" rather than receiving data for all tables that are available. Of course, the change parameters need not be limited to table availability changing from greater than zero to zero or vice-versa. The example shown in FIGS. 4A and 4B is illustrative only. The change parameters can be configured to be any number of table capacities. For example, decision block 76 could be used for determining if more than two tables become available (or once were available and now are no longer available).

Regardless of availability changes and CacheUpdate messages in steps 76 through 79, the ERB 18 determines if the lock was successful in step 80 in order to determine how to reply to the request from website 10. If unsuccessful, an error message is sent from ERB 18 to the website 10 and the website handles this error in step 82. If successfully locked, a success message is returned to website 10 in step 84, which message includes a LockID identifying the specific lock that is held for the customer. The customer fills in the reservation details in step 84 and the website 10 sends his/her reservation request along with the saved Lock ID for the reservation to the ERB 18 in step 85. The ERB 18 checks if the lock timeout has expired for the given Lock ID in step 86. If it has expired, the ERB 18 attempts to relock the given date/time/party size. If the timeout has not expired or if the relock was successful, the ERB 18 checks if the reservation causes the number of available tables for the given party size, date, and time to drop to zero (step 87). If so, the ERB 18 immediately sends a CacheUpdate message to the cache server 16 (step 88) informing the cache server 16 that the cache must be updated with respect to that ERB 18. The cache server 16 applies the CacheUpdate in step 89 and, as a result, no longer offers tables of the selected size at the given date and time. If ERB 18 determines that the requested slot is available (the Lock ID is still valid or, in case of timeout, the date/time/party size was successfully locked again) in step 86, a "success" message is sent to the website 10 in step 90 informing the website 10 that the requested reservation was successful in step 91. If the requested date/time/party size is not available, a "failure" message is sent to the website 10 in step 92 and the website handles that error appropriately.

The method and system described herein utilizes multiple cache levels to improve performance on the website 10 and the ERBs 18 as well as to reduce real-time communication between the website 10, the cache server 16, and the ERBs 18. Each restaurant database, i.e., ERB 18, contains data regarding every piece of inventory, i.e., table, in the restaurant. In one embodiment, each restaurant may also include local cache memory. The cache at each restaurant includes the exact amount of available table inventory for each time slot for a certain time period and party size range. For example, the restaurant cache might include 60 days of availability for party sizes from 2 to 10, with 96 time slots each day, at 15 minutes per time slot. Thus, while the restaurant's database contains a complete table inventory record, its cache contains counts of only those tables that are available, based upon table capacity (party size) and time slot. The ERB 18 cache typically maintains 60 days of look-ahead availability because 98% of the searches are expected to be in the cache (referred to herein as the cache hit rate) when thusly configured, although this could be increased or decreased depending on the configuration. The cache can be configured to achieve any desired hit rate. If a higher cache hit rate is desired, the party size range could be increased or the number of days cached could be increased, however, this increase in the cache hit rate comes at the expense of more memory used for the cache.

In contrast, the cache server 16 caches its inventory information differently. While each restaurant database maintains a complete inventory of tables, the cache server 16 maintains only a subset of the entire restaurant inventory for a shorter time period. For example, because most customer searches are for tables of capacities 2 to 6 within the next 30 days, only table availability for this size over the next 30 days is stored in the cache. Searches within these variables can be answered directly from cache server 16 with no messages being exchanged with the restaurant servers (ERBs 18).

Thus, the cache server 16 constantly requests and receives summary inventory information, e.g., changes in table availability, from the participating restaurant ERBs 18 regarding "material" changes in the restaurant's inventory. The material changes relate to whether the number of available tables at that restaurant on a given day for a party size range, e.g. between 2 and 6, has changed from "not available" (where there are zero tables available) to "available" (meaning there is at least one table available) or vice-versa. In this fashion, the cache server 16 stores only enough inventory information for each ERB 18 that is needed to determine if a table is available rather than how many tables are available. This advantageously results in (1) a tremendous reduction of unnecessary traffic between the website 10, the cache server 16, and the ERBs 18, (2) a reduction in the time needed to perform a search, (3) faster responses to the customer, and (4) a decrease in the amount of overall resources used by the system and all components in that system.

The cache server 16 needs only to be concerned with summary inventory information and changes made to that summary inventory information, not the actual inventory of available tables. Further, because approximately 98% of all table inquiries are for parties between 2 and 6, and within 30 days of the inquiry, the cache server 16 may only choose to maintain summary information looking ahead 30 days, instead of 60, and for table capacities between 2 and 6, instead of between 2 and 10. Thus, the cache server 16 stores only summary table availability information for a subset of the look-ahead time and table party size capacity that are used by the restaurant's cache. Each of these caching features serves to decrease the response time to the customer and reduce the usage of system resources. Because the website 10 has access to its own cache (cache server 16), the restaurant servers receive only a very small percentage, e.g., 2%, of the total amount of searches, thus enabling the website 10 to respond to the user inquiry simply by referring to the summary inventory information stored in the cache server 16.

Very few user inquiries, perhaps two percent, require the website 10 to contact the ERBs 18 directly. When this occurs, the ERB 18's cache is queried first. If it can be determined, based upon the table availability information stored in the restaurant's cache, whether or not a table of the requested time and capacity is available, then a determination is made. Typically, the ERB's 18 cache contains the information necessary to fulfill the user's request. A very small percentage of the time, again, perhaps 2%, the ERB's 18 cache cannot determine whether the requested table is available (e.g., it may be a table request for greater than 10 or for a table in greater than 60 days from the date of the request). In this scenario, the restaurant's database is consulted directly. Because the restaurant's database contains all table inventory information, the user's query can be answered.

The cache server 16 cache configuration parameters of party sizes 2 to 6 and for up to 30 days in the future are chosen so that the cache hit rate is 98%; therefore only 2% of all searches are not able to be satisfied solely from the cache server 16 and result in a search of the ERB 18. The ERB 18 cache configuration parameters of party sizes 2 to 10 and for up to 60 days in the future are chosen so that the cache hit rate is 98% as well, therefore only 2% of the searches that reach the ERB are not able to be satisfied solely from the ERB 18 cache and result in a search of the database. Therefore, only 2% (cache miss rate in the ERB 18 cache) of 2% (cache miss rate in the cache server 16 cache) actually result in database access (and disk access, slower performance, and more system resource usage) at the ERB.

The multilevel inventory caching system described herein utilizes one type of caching scheme at the restaurant server level and another at the cache server 16. The cache server 16 only caches information relating to whether or not there is availability for a certain party size at a specific time slot. Instead of updating the cache server 16 every time the number of available tables of a particular size for a particular slot changes (for example, instead of three available tables for a party of four, a fourth table for a party of four has become available), the restaurant servers (ERBs 18) only need to notify the cache server 16 if the number of tables for that time and party size materially changes (i.e., changes from more than zero to zero, or vice-versa, or whatever the definition of "material changes" is set by the system). Therefore, instead of sending perhaps hundreds of messages to the website each time the number of tables that are available changes, only update messages necessitated by material status changes are sent to the website because the necessary data is already stored in "summary" form, in the cache server 16.

The multilevel inventory caching system described herein advantageously uses a hierarchal search mechanism whereby it distributes resources to increase efficiency. When a customer initiates a search, first, the cache server 16 is checked. If the cache server 16 contains the necessary availability information to satisfy the search, then a response to the request can be adequately and quickly generated without the website 10 making any further requests. If the information is not completely present in the search reply from the cache server 16, the website 10 proceeds to search the ERB 18 directly for all ERBs 18 for which the reply from the cache server 16 search did not contain results. If this search of the ERB 18 cache fails to satisfy the request, finally, the ERB 18 searches the restaurant's database directly. Thus, instead of proceeding directly to the restaurant's database, the hierarchal searching system of the present invention provides multiple levels of caching, which, for the large majority of customer requests, can provide information regarding available inventory quickly and efficiently. The size and configuration of both caches can be tuned to achieve the desired cache hit rate.

The cache in the ERBs 18 are not limited to any particular table size or look ahead time. Therefore, the ERB 18 cache may not be configured to store 60 days of information regarding table sizes 2 to 10 but, instead, configured to store, for example, 30 days or 90 days worth of data, for table capacities varying between 6 and 12. Regardless of what parameters are chosen for the ERB 18, the cache server 16 does not need to store as much information (i.e., 30 days for table sizes of 2 to 6 instead of 60 days for table sizes of 2 to 10), or the same kind of information (binary data opposed to numerical values) to accurately and efficiently respond to a large percentage of user search requests.

As described above, the "yes" status (e.g., binary 1) means that the desired restaurant has at least one table available for the capacity and time requested, while a "no" status (e.g., binary 0) means that no tables of the requested capacity and at the requested time are available. In another embodiment, the "yes/no" availability status at the website cache can take on a different meaning. For example, the "yes" status can mean that two or more tables for the requested size and time are available, while a "no" status means that less than two tables are available. This may be expanded for "three or more tables" or any other desired variation. For example, certain restaurants rarely receive requests for a single table and, instead, often host banquets and large functions that must accommodate sets of multiple tables at one sitting.

The "yes/no" parameters need not only be for table capacity but may correspond to virtually any variable associated with the restaurant (or associated with the kind of functionality that the ERB 18 provides, such as inside or outside seating, or smoking or nonsmoking sections). For example, the restaurant parameters may correspond to table location, geographic location of the restaurant, or the type of food being served at the restaurant. Parameters for educational programs, sporting or entertainment events, and/or transportation systems each have their own particular characteristics.

In another embodiment, the table availability could include location within the restaurant. The website 10 may prompt the user to enter a preferred table location, e.g., outside, away from the kitchen, not directly underneath an air conditioner vent, etc. Again, each ERB 18 need only inform the cache server 16 when a table meeting the desired size and/or location becomes available rather than how many of these tables are actually available.

In yet another embodiment, the website 10 includes a cache server 16 that still stores inventory availability information in a "summary" form but the inventory information at each restaurant is not cached at all.

Figure 5:
FIG. 5 is a diagrammatic representation of an introductory web page presented on a user's terminal when signing on a host website that incorporates the system and method according to the invention.

The web page shown in FIG. 5 is an example of a screen that is presented to a customer when utilizing the present invention. The customer is presented initially with a choice of specific geographic regions from which to choose from. In one embodiment, the more popular regions 98 may be listed in bold, in a separate section on the page, and/or in a larger font for easier access, while other, less popular regions 100 may be listed in a smaller font. The customer then selects a region that he or she wishes to search in. As an example illustrated in FIG. 5, the customer selects the "Atlanta" region.

FIG. 6 illustrates an exemplary screen that may be presented to the user after the region selection. The screen confirms the customer's choice of region 102 and further breaks the selected region down into neighborhoods 104 that can be scrolled through. The customer is also presented with a selection of different cuisines 106. The customer enters the desired party size 108 and the date 110 and time 112 that the customer wishes to reserve. Finally, the customer may further limit their search by entering a price range 114.

After choosing a neighborhood (if desired), price range (if desired), cuisine (if desired), party size, date, and time, the customer clicks the search button 116 and is presented with a screen that is shown, for example, in FIG. 7. The website 10, after receiving the "search" command (step 56 in FIG. 4A), first searches the cache server 16 for availability information for each ERB 18 and, if not, searches for the availability information at all of the participating restaurants (steps 57 through 68 in FIG. 4A). Rather than querying each ERB 18 for all searches, the website 10 initially accesses the cache server 16, which now contains the "summary" of table availability information for each participating ERB 18 and, only if necessary, searches each ERB 18 that does not have availability information in the cache server 16. Ultimately, the website 10 displays the availability information to the customer (step 70 in FIG. 4A) responsive to the customer's search parameters. Now, the customer can select a restaurant and confirm the desired reservation time. Thereafter, a screen can be presented to the customer with specific information about the selected restaurant (see, e.g., FIG. 7) and the customer, prior to making the reservation 118, fills in reservation details such as his/her name and phone number.

The method and system described herein is not limited to restaurant table availability, but may be expanded to any form of inventory inquiry system through a communications network. For example, the system may be applied to on-line merchandising where warehouse inventories are polled to determine the availability of certain size items. Each warehouse need only send "yes/no" availability changes to the host cache, rather than the host cache having to store each warehouse's entire inventory for each item. Time-slot availability for educational programs, sporting events, or any other type of entertainment may also utilize the disclosed system. Alternatively, transportation systems may also utilize the disclosed system to facilitate passenger ticketing on, for example, airlines, trains and buses, at a central location based on distributed availability information.

The method and system of the present invention provides a multiple-level caching system configured to enhance the performance of online inventory systems. Although there is information being cached at both central and local servers, only material changes in inventory information ("summary information") is cached at the central server. By maintaining complete inventory information on a local server at each ERB (one level), and maintaining only summary inventory information at a central server (a second level), the present invention provides a multilevel system able to substantially accelerate the response time to inquiries regarding inventory availability. Further, the bandwidth required for communication between the central server and the local servers is dramatically reduced therefore reducing bandwidth cost as well. In addition, the load on all parts of the system is also reduced, enabling the system to be implemented with lower cost equipment and also enabling far greater scalability than the prior art. Utilizing the present invention eliminates the need for the local servers to constantly send inventory updates to the central server, rather inventory updates are only sent for material changes in inventory.

The present invention can be realized in hardware, software, or a combination of hardware and software. An implementation of the method and system of the present invention can be realized in a centralized fashion in one computer system or in a distributed fashion where different elements are spread across several interconnected computer systems. Any kind of computer system, or other apparatus adapted for carrying out the methods described herein, is suited to perform the functions described herein.

A typical combination of hardware and software could be a general purpose computer system with a computer program that, when being loaded and executed, controls the computer system such that it carries out the methods described herein. The present invention can also be embedded in a computer program product, which includes all the features enabling the implementation of the methods described herein, and which, when loaded in a computer system is able to carry out these methods.

Computer program or application in the present context means any expression, in any language, code or notation, of a set of instructions intended to cause a system having an information processing capability to perform a particular function either directly or after either or both of the following: (a) conversion to another language, code, or notation; and b) reproduction in a different material form. Significantly, the present invention can be embodied in other specific forms without departing from the spirit or important attributes thereof and, accordingly, reference should be had to the following claims, rather than to the foregoing specification, as indicating the scope of the invention.

It will be appreciated by persons skilled in the art that the present invention is not limited to what has been particularly shown and described herein above. In addition, unless mention was made above to the contrary, it should be noted that all of the accompanying drawings are not to scale. A variety of modifications and variations are possible in light of the above teachings without departing from the scope and spirit of the invention, which is limited only by the following claims.

What is claimed is:

1. A system for providing availability information comprising:
    a web server to receive a user inquiry regarding availability of inventory items associated with a plurality of location servers corresponding to a plurality of locations, wherein the availability of inventory items comprises availability of one or more types of tables and the user inquiry includes a specified capacity and a specified time;
    a cache server to:
        cache a summary of availability information for the plurality of location servers, wherein availability information in the summary is represented by one of two values: a first value indicating that at least one inventory item for the specified capacity at the specified time is available and a second value indicating that no inventory items for the specified capacity at the specified time is available,
        receive an update of the summary of availability information in the event of a material change of an availability of inventory items associated with the location servers, wherein the material change of the availability comprises at least one of a status change in the availability of a type of inventory item from an available status to a not available status and a status change in the availability of the type of inventory item from a not available status to an available status;
        update the summary of availability information in the cache server; and
        provide the summary of availability information to the web server.

2. The system as in claim 1, wherein each of the location servers stores a complete set of inventory availability information regarding all of the inventory items associated with one of the location servers.

3. The system as in claim 1, wherein the cache server is to provide at least a part of the summary of availability information in response to the user inquiry.

4. The system as in claim 1, wherein the cache server is to keep track of the location servers.

5. The system as in claim 1, wherein the cache server is to keep track of a last time of contact with each location servers.

6. The system as in claim 1, wherein the summary of availability information comprises one or more of the following: availability of a table of a specific capacity, availability of a table within a range of capacities, no availability of a table of a specific capacity, and no availability of a table within a range of capacities.

7. The system as in claim 1, wherein the material change comprises a status change of the availability of a predetermined number of tables to no availability of the predetermined number of tables and vice versa.

8. The system as in claim 1, wherein the summary of availability information comprises one or more of the following: availability of a table with a preferred location and no availability of a table with a preferred location.

9. The system as in claim 1, wherein the plurality of location servers automatically monitor the material change of the availability of the inventory items and, upon detection of the material change, send a message of the material change to the cache server.

10. The system as in claim 1, wherein the summary of availability information comprises one or more of the following: availability of a table at which smoking is allowed, availability of a table at which no smoking is allowed, no availability of a table at which smoking is allowed, and no availability of a table at which no smoking is allowed.

11. The system as in claim 1, wherein the summary of availability information comprises one or more of the following: availability of a table with a predetermined associated variable and no availability of a table with a predetermined associated variable.

12. The system as in claim 1, wherein:
    the location servers comprise restaurant reservation availability servers; and
    availability of the inventory items comprises availability of one or more restaurant tables.

13. The system as in claim 12, wherein the availability of one or more restaurant tables includes one or more of the following: an available time, an available date, an available capacity, an available table location, an available table with a predetermined associated variable, an available table at which smoking is allowed, an available table at which no smoking is allowed, and an available number of tables.

14. The system as in claim 12, wherein the availability of one or more restaurant tables includes an available date within a look-ahead period.

15. The system as in claim 1, wherein the web server is to determine if a response to the user inquiry can be provided based on the summary of availability information.

16. The system as in claim 1, wherein the cache server stores, with respect to availability information, only the summary of availability information.

17. The system as in claim 1, wherein each of the plurality of location servers corresponds to a respective restaurant.

18. A method for providing availability information comprising:
    receiving a user inquiry regarding availability of inventory items associated with a plurality of location servers corresponding to a plurality of locations, wherein the availability of inventory items comprises availability of one or more types of tables and the user inquiry includes a specified capacity and a specified time;
    caching a summary of availability information for the plurality of location servers, wherein availability information in the summary is represented by one of two values: a first value indicating that at least one inventory item for the specified capacity at the specified time is available and a second value indicating that no inventory items for the specified capacity at the specified time is available;
    receiving an update of the summary of availability information in the event of a material change of an availability of inventory items associated with the plurality of location servers, wherein the material change of the availability comprises at least one of a status change in the availability of a type of inventory item from an available status to a not available status and a status change in the availability of the type of inventory item from a not available status to an available status;
    updating the summary of availability information in a cache server; and
    providing the summary of availability information to a web server.

19. A computer program product for providing availability information, the computer program product being embodied in a non-transitory computer readable medium and comprising computer instructions for:
    receiving a user inquiry regarding availability of inventory items associated with a plurality of location servers corresponding to a plurality of locations, wherein the availability of inventory items comprises availability of one or more types of tables and the user inquiry includes a specified capacity and a specified time;
    caching a summary of availability information for the plurality of location servers, wherein availability information in the summary is represented by one of two values: a first value indicating that at least one inventory item for the specified capacity at the specified time is available and a second value indicating that no inventory items for the specified capacity at the specified time is available;
    receiving an update of the summary of availability information in the event of a material change of an availability of inventory items associated with the location servers, wherein the material change of the availability comprises at least one of a status change in the availability of a type of inventory item from an available status to a not available status and a status change in the availability of the type of inventory item from a not available status to an available status;
    updating the summary of availability information in a cache server; and
    providing the summary of availability information to a web server.

* * * * *